(12) United States Patent
Hegde et al.

(10) Patent No.: US 9,614,906 B1
(45) Date of Patent: Apr. 4, 2017

(54) APPLICATION-SPECIFIC CONNECTIVITY LOSS DETECTION FOR MULTICAST VIRTUAL PRIVATE NETWORKS

(71) Applicant: Juniper Networks, Inc., Sunnyvale, CA (US)

(72) Inventors: Vikas Hegde, Bangalore (IN); Santosh Pallagatti Kotrabasappa, Bangalore (IN); Chandrasekar Ramachandran, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 23 days.

(21) Appl. No.: 14/754,016

(22) Filed: Jun. 29, 2015

Related U.S. Application Data (63) Continuation of application No. 13/717,602, filed on Dec. 17, 2012, now Pat. No. 9,071,514.

(51) Int. Cl.
  *H04L 12/24* (2006.01)
  *H04L 29/08* (2006.01)
  *H04L 12/26* (2006.01)
  *H04W 36/30* (2009.01)
  *H04L 12/721* (2013.01)
  *H04L 12/761* (2013.01)

(52) U.S. Cl.
  CPC ........ *H04L 67/104* (2013.01); *H04L 43/0811* (2013.01); *H04L 43/10* (2013.01); *H04L 45/16* (2013.01); *H04L 45/70* (2013.01); *H04W 36/30* (2013.01)

(58) Field of Classification Search
  CPC . H04L 41/0668; H04L 41/12; H04L 43/0811; H04L 45/02; H04L 45/16; H04L 43/10; H04L 45/28

USPC .......................................................... 370/218
See application file for complete search history.

(56) References Cited

U.S. PATENT DOCUMENTS 7,184,437 B1  2/2007 Cole et al.
8,339,959 B1  12/2012 Moisand et al.
(Continued)

OTHER PUBLICATIONS

Hegde et al., "Multipoint BFD for MPLS," Network Working Group Internet Draft, draft-chandra-hegde-mpoint-bfd-for-mpls-00, Mar. 5, 2012, 12 pp.
(Continued)

*Primary Examiner* — Ian N Moore
*Assistant Examiner* — Mewale Ambaye
(74) *Attorney, Agent, or Firm* — Shumaker & Sieffert, P.A.

(57) ABSTRACT

An egress network device of a point-to-point (P2P) tunnel can receive an LSP Ping message via the P2P tunnel from an ingress network device of the P2P LSP, wherein the LSP Ping message specifies a label that the egress network device associates with a service provided to the egress network device via the P2P tunnel. In response to receiving the LSP Ping message, the egress network device can store an association between the label and the P2P tunnel. The egress network device also uses a fault detection network protocol session over the P2P tunnel to monitor a state of the P2P tunnel. In response to detecting based on the fault detection network protocol session that the state of the P2P tunnel is down, the egress network device determines the service is unavailable from the ingress network device via the P2P tunnel, and selects a new source to provide the service.

14 Claims, 4 Drawing Sheets

(56) References Cited

U.S. PATENT DOCUMENTS

| | | | |
|---|---|---|---|
| 9,071,514 B1 | 6/2015 | Hegde et al. | |
| 2008/0172732 A1* | 7/2008 | Li | H04L 12/4641 726/15 |
| 2010/0202297 A1* | 8/2010 | Liu | H04L 43/0811 370/242 |
| 2010/0214913 A1* | 8/2010 | Kompella | H04L 12/5695 370/230 |
| 2011/0286452 A1* | 11/2011 | Balus | H04L 12/4641 370/390 |

OTHER PUBLICATIONS

Awduche et al., "RSVP-TE: Extension to RSVP for LSP Tunnels," RFC 3209, Network Working Group, The Internet Society, Dec. 2001, 61 pp.

Rosen et al., "BGP/MPLS IP Virtual Private Networks (VPNs)," RFC 4364, Network Working Group, The Internet Society, Feb. 2006, 48 pp.

Kompella et al., "Detecting Multi-Protocol Label Switched (MPLS) Data Plane Failures," RFC 4379, Network Working Group, The Internet Society, Feb. 2006, 50 pp.

Aggarwal et al., "Bidirectional Forwarding Detection (BFD) for MPLS Label Switched Paths (LSPs)," RFC 5884, Internet Engineering Task Force, IETF, Jun. 2010, 12 pp.

Rosen et al., "Multicast in MPLS/BGP IP VPNs," RFC 6513, Internet Engineering Task Force, IETF, Feb. 2012, 89 pp.

Aggarwal et al., "BGP Encodings and Procedures for Multicast in MPLS/BGP IP VPNs," RFC 6514, Internet Engineering Task Force, IETF, Feb. 2012, 60 pp.

Rosen et al., "Multicast in MPLS/BGP IP VPNs," Network Working Group Internet draft, IETF, draft-ietf-l3vpn-2547bisw-mcast-10, Jan. 28, 2010, 89 pp.

Swallow et al., "Connectivity Verification for Multicast Label Switched Paths," Network Working Group Internet Draft, IETF, draft-ietf-mpls-mcast-cv-00, Apr. 2007, 14 pp.

U.S. Prosecution History from U.S. Pat. No. 9,071,514, dated Dec. 17, 2012 through May 18, 2015, 56 pp.

\* cited by examiner

APPLICATION-SPECIFIC CONNECTIVITY LOSS DETECTION FOR MULTICAST VIRTUAL PRIVATE NETWORKS

This application is a continuation of U.S. application Ser. No. 13/717,602, filed Dec. 17, 2012, now U.S. Pat. No. 9,071,514, the entire contents of which is incorporated herein by reference.

TECHNICAL FIELD

The disclosure relates to computer networks and, more particularly, to detecting connectivity loss within a computer network.

BACKGROUND

A computer network is composed of a set of nodes and a set of links that connect one node to another. For instance, a computer network may be composed of a set of routers while the set of links may be cables between the routers. When a first node in the network sends a message to a second node in the network, the message may pass through many links and many nodes. The links and nodes the message passes through while traveling from the first node to the second node is referred to as a path.

Packet-based computer networks increasingly utilize label switching protocols for traffic engineering and other purposes. In a label switching network, label switching routers (LSRs) use Multi-Protocol Label Switching (MPLS) signaling protocols to establish label switched paths (LSPs). The LSRs utilize MPLS protocols to receive MPLS label mappings from downstream LSRs and to advertise MPLS label mappings to upstream LSRs. When an LSR receives an MPLS packet from an upstream router, it switches the MPLS label according to the information in its forwarding table and forwards the packet to the appropriate downstream LSR.

An LSP can be used to transport one or more services to network devices. One example of such a service is a Virtual Private Network (VPN) service. For example, Internet Protocol (IP) multicast traffic can travel from one Virtual Private Network (VPN) site to another within a Border Gateway Protocol (BGP)/MPLS IP VPN. Protocols and procedures for doing so are described in E. Rosen, "Multicast in MPLS/BGP IP VPNs," Internet Engineering Task Force, RFC 6513, February 2012, the entire contents of which are incorporated by reference herein. One example procedure described in RFC 6513 for carrying MVPN data traffic through unicast tunnels is ingress replication. Ingress replication is a mechanism for distributing multicast traffic, which uses point-to-point (P2P) unicast tunnels between network devices to give an impression of multicast forwarding. An ingress network device of the P2P tunnels replicates packets received from a multicast source, and the ingress network device sends the replicated packets to a plurality of egress network devices via the respective P2P tunnels. The ingress network device (e.g., a provider edge (PE) router) can use an MPLS label to tag multicast VPN packets and send them through the same P2P LSPs that carry unicast VPN packets. The MPLS label used for tagging the VPN packets is downstream allocated and advertised by the egress PE router. One example use of ingress replication provider tunnels is a routing instance type of forwarding that uses ingress replication provider tunnels to carry IP multicast data between routers through an MPLS cloud, using MBGP (or Next Gen) MVPN. Ingress replication provider tunnels may be used for sending multicast traffic for providing various services, such as Internet Protocol Television (IPTV), desktop conferences, corporate broadcasts, music and video web casts, and other forms of multimedia content.

Links and nodes in a computer network may fail without warning. Consequently, one of the tunnels that the ingress network device was using to communicate with an egress network device may stop functioning. To ensure that the ingress network device and the egress network device do not send messages on a tunnel that is not functioning, the devices may periodically verify the status of the tunnel's path by sending a message through the path and receiving a response through the path. One mechanism for verifying connectivity along a tunnel such as an LSP, referred to as "LSP ping," is described by RFC 4379, K. Kompella, "Detecting Multi-Protocol Label Switched (MPLS) Data Plane Failures", RFC 4379, February 2006, hereby incorporated herein by reference. In general, LSP ping utilizes a form of MPLS "echo requests" and "echo replies" for detecting MPLS data plane failures and for verifying the MPLS LSP data plane against the control plane. Another mechanism for verifying connectivity along an LSP is Bidirectional Forwarding Detection (BFD). BFD is sometimes used on a per-service basis for those services transported by an LSP, which requires a separate BFD session for each service.

SUMMARY

In general, this disclosure is directed to techniques for detecting connectivity loss within a computer network, and, more specifically, for application-specific connectivity detection for network traffic transported through network tunnels. For example, the techniques of this disclosure can enable an egress network device of a point-to-point (P2P) tunnel to detect a loss of connectivity for particular services for which the tunnel is utilized as a transport mechanism. If the egress network device detects that connectivity is lost for the P2P tunnel, the egress network device can fail over specific services that utilize the tunnel to a different transport tunnel. The techniques of this disclosure can facilitate Operation, Administration and Management (OAM) of P2P tunnels used for multicast virtual private networks (VPNs), particularly where ingress replication is used to transport multicast VPN services over the P2P tunnels. The techniques may be used at an egress router of P2P tunnels that transport the multicast services to monitor the health of the P2P tunnels and to associate an OAM status of each P2P tunnel to the one or more application services (e.g., a multicast service) running over the P2P tunnel.

The techniques of this disclosure may be useful in OAM for label switched paths (LSPs), and particularly useful where P2P transport LSPs are used for multicast VPNs with ingress replication. In some example aspects, the ingress network device of an LSP can use an LSP ping protocol to send to the egress network devices LSP ping messages that have been extended to include additional information to uniquely identify one or more services transported by the LSP and one or more corresponding MPLS labels for the services. The egress network device can use the information carried in the LSP ping messages to map the services to the P2P LSP that is used to transport the service. The egress network device can use an OAM protocol, such as a fault detection network protocol (e.g., a Bidirectional Forwarding Detection (BFD) session) running from the ingress network device to the egress network device, to monitor a state of the P2P LSP. In response to detecting, with the BFD session, that connectivity has been lost for the P2P LSP, the egress network device can determine the individual affected services, and can select one or more new P2P LSPs to transport the affected services.

The techniques of this disclosure may provide one or more advantages. For example, the techniques of this disclosure do not require application of OAM for individual services, thereby providing a scalable solution. For example, the techniques do not require an OAM session (e.g., a BFD session) to be established for each service, but may utilize a single OAM session (e.g., BFD session) that is associated with the underlying P2P tunnel used to transport the services. This may provide a scalable approach, because the number of underlying P2P tunnels may, in some cases, be significantly less than the number of services running over the P2P tunnels. This approach may, therefore, greatly reduce the number of OAM sessions than would otherwise be established.

In other words, the egress network device may monitor the data path of the P2P transport tunnel, and may then "fate-share" the status of services running over the P2P transport tunnel with the services with P2P tunnel used to transport the services. By fate sharing the OAM of the services with that of the P2P tunnel, the egress network device can act on failures in a much more efficient manner than acting on individual service failures. The egress network device may, for example, take bulk action to secure new sources for a specific set of services based on a single connectivity failure notification, instead of having to handle multiple failure notifications.

In one example aspect, a method includes by an egress network device of a P2P tunnel, receiving a connectivity detection protocol message via the P2P tunnel from an ingress network device of the P2P tunnel, wherein the connectivity detection protocol message specifies a label associated with one of a plurality of services provided to the egress network device via the P2P tunnel, wherein the P2P tunnel serves as a transport tunnel for the plurality of services. The method also includes, by the egress network device, detecting based on a fault detection network protocol session over the P2P tunnel between the ingress network device to the egress network device that a state of the P2P tunnel is down, and in response the detecting and by the egress network device, determining that the one of the plurality of services is unavailable from the ingress network device via the P2P tunnel based on the label associated with the one of the plurality of services, and selecting a new source to provide the one of the plurality of services.

In another example aspect, a network device includes an interface for receiving a connectivity detection protocol message via a P2P tunnel from an ingress network device of the P2P tunnel, wherein the connectivity detection protocol message specifies a label associated with one of a plurality of services provided to the egress network device via the P2P tunnel, wherein the P2P tunnel serves as a transport tunnel for the plurality of services; and a hardware-based processor for executing a fault detection module to detect based on a fault detection network protocol session over the P2P tunnel between the ingress network device to the egress network device that a state of the P2P tunnel is down. In response the detecting, the fault detection module determines that the one of the plurality of services is unavailable from the ingress network device via the P2P tunnel based on the label associated with the one of the plurality of services, and a routing component that selects a new source to provide the one of the plurality of services.

In a further example aspect, a computer-readable storage medium includes instructions for causing a programmable processor to by an egress network device of a point-to-point (P2P) tunnel, receive a connectivity detection protocol message via the P2P tunnel from an ingress network device of the P2P tunnel, wherein the connectivity detection protocol message specifies a label associated with one of a plurality of services provided to the egress network device via the P2P tunnel, wherein the P2P tunnel serves as a transport tunnel for the plurality of services. The computer-readable storage medium also includes instructions to detect based on a fault detection network protocol session over the P2P tunnel between the ingress network device to the egress network device that a state of the P2P tunnel is down, and in response the detecting, determine that the one of the plurality of services is unavailable from the ingress network device via the P2P tunnel based on the label associated with the one of the plurality of services, and selecting a new source to provide the one of the plurality of services.

The details of one or more examples are set forth in the accompanying drawings and the description below. Other features, objects, and advantages will be apparent from the description and drawings, and from the claims.

DETAILED DESCRIPTION

Figure 1:
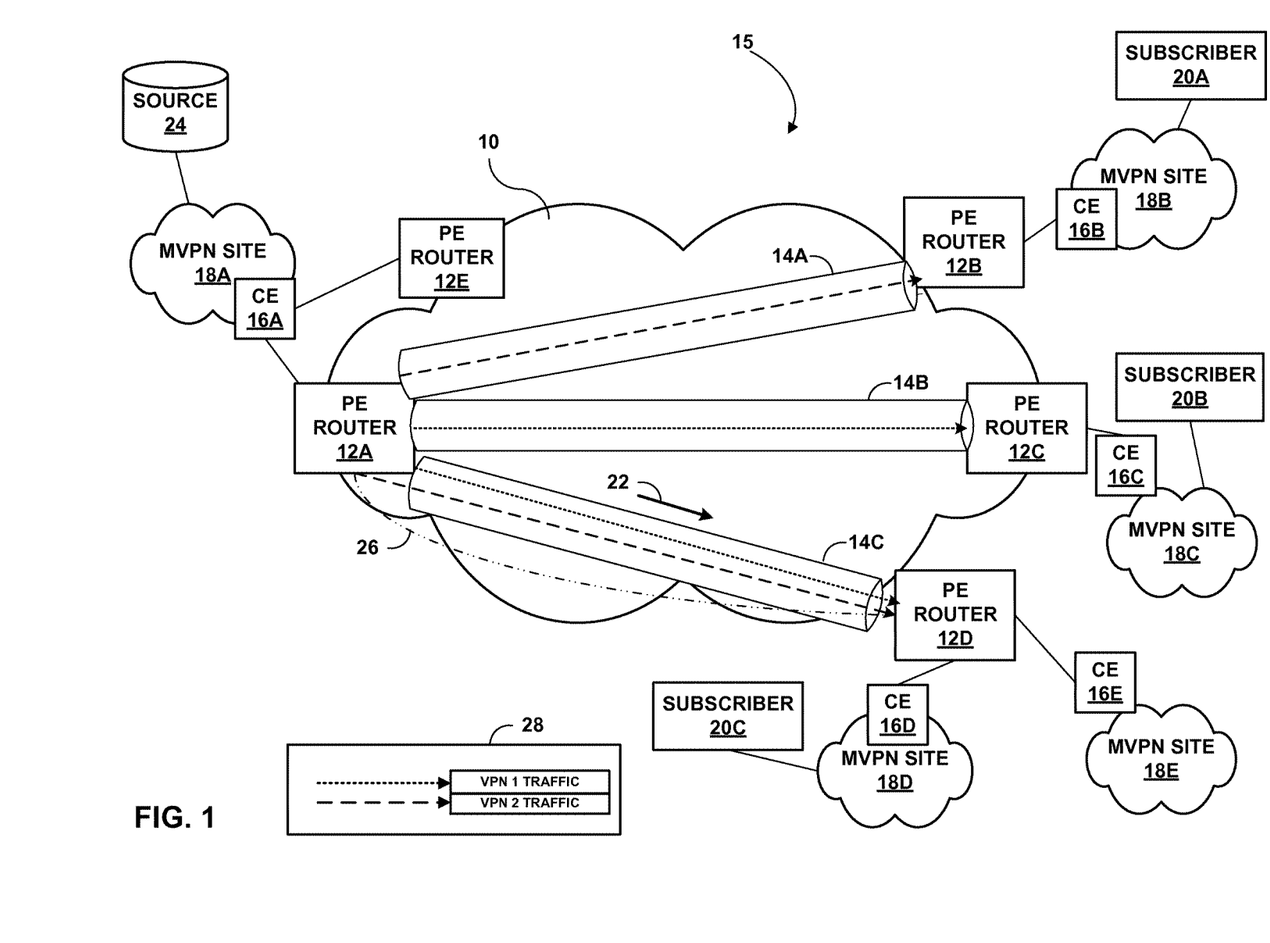
FIG. 1 is a block diagram illustrating an example service provider (SP) network in which techniques described herein may be implemented.

FIG. 1 is a block diagram illustrating a system 15 having an example service provider (SP) network 10 in which provider edge (PE) routers 12A-12E ("PE routers 12") establish point-to-point (P2P) transport tunnels 14A-14C ("P2P tunnels 14") between PE routers 12. In the example of FIG. 1, PE router 12A is the ingress network device of tunnels 14, and PE routers 12B, 12C, and 12D are egress routers of the respective P2P tunnels 14A, 14B, and 14C. In one example, PE routers 12 may establish the P2P tunnels 14 within SP network 10 as a set of P2P label switched paths (LSPs) using any of a variety of protocols for multi-protocol label switching (MPLS), such as label distribution protocol (LDP) or the resource reservation protocol (RSVP), which may be extended to include traffic engineering (RSVP-TE).

In one example, PE routers 12 provide multicast virtual private network (MVPN) services to one or more of the MVPN sites 18A-18E via customer edge (CE) routers 16A-16E ("CE routers 16"). For example, P2P tunnels 14 may comprise P2P LSPs that transport L3 multicast traffic from a multicast source 24 to subscriber devices 20A-20C ("subscribers 20") within at least one of MVPN sites 18 coupled to PE routers 12. In the example of FIG. 1, the ingress network device of tunnels 14, i.e., PE router 12A, performs ingress replication of multicast content sent to subscribers. P2P tunnels 14 may carry L3 multicast traffic, such as Internet Protocol Television (IPTV), desktop conferences, corporate broadcasts, music and video web casts, and other forms of multimedia content, from multicast source 24 to subscriber devices 20 within MVPN sites 18B-18E. Example protocols and procedures for establishing P2P LSPs for MVPNs are described E. Rosen, "Multicast in MPLS/BGP IP VPNs," Internet Engineering Task Force, RFC 6513, February 2012, the entire contents of which are incorporated by reference herein.

SP network 10 may comprise one or more service provider networks or another intermediate private or public network. In some cases, SP network 10 may comprise a multi-protocol label switching (MPLS) network. Each of MVPN sites 18 may include a local area network (LAN) or a wide area network (WAN) that comprises a plurality of subscriber devices, such as desktop computers, laptops, workstations, PDAs, wireless devices, network-ready appliances, file servers, print servers or other devices.

Routers 12 are connected to one another through links (not shown) and possibly through intermediate devices (not shown). For instance, PE router 12A is connected to PE routers 12B-12D. Although not illustrated, PE router 12E may also be connected to PE routers 12B-12D. The links may be any type of computer network transmission medium. For instance, a link in network 10 may be a fiber optic cable, an Ethernet cable, a wireless connection, and so on. While network 10 is operating, a link or a node (e.g., routers 12 or an intermediate router) in network 10 may fail. For example, a storm may sever a link between PE router 12A and an intermediate router. As another example, a power failure, hardware failure or a programming fault may cause an intermediate router along one of P2P tunnels 14 to stop functioning. Failure of a link or node may occur without warning to nodes that use the link or node to communicate. Consequently, for a period of time, a node may continue sending messages through a path that is no longer functioning. Packets sent through such a path may be lost or delayed.

Different VPN services are provided to egress PE routers 12B-12D in a multicast manner by PE router 12A via P2P tunnels 14. The VPN services may originate from source network device 24 via MVPN site 18A. To request delivery of the VPN services, egress PE routers 12C, 12D allocate and advertise VPN labels to PE router 12A for use in forwarding the VPN traffic that is requested by subscribers reachable by egress PE routers 12C, 12D. This direction of label advertisement is called "downstream-allocated."

In FIG. 1, for example, PE router 12C advertises a VPN label to PE router 12A for a first VPN service "VPN 1," as does PE router 12D. PE router 12C and PE router 12D can advertise the labels in a "service request" message, such as an Intra-AS I-PMSI A-D Route. PMSI refers to "P-Multicast Service Interface." The service request can include a Route Distinguisher, which is used to distinguish the distinct virtual private network (VPN) routes of separate customers who connect to the provider.

Ingress PE router 12A receives first VPN traffic associated with a first VPN service "VPN 1," and ingress PE router 12A replicates the VPN traffic and sends copies of the VPN traffic to egress PE router 12C through P2P tunnel 14B, and to egress PE router 12D through P2P tunnel 14C. Similarly, PE router 12B advertises a VPN label to PE router 12A for a second VPN service "VPN 2," as does PE router 12D. Ingress PE router 12A receives second VPN traffic associated with the second VPN service "VPN 2," and ingress PE router 12A replicates the VPN traffic and sends copies of the VPN traffic to egress PE router 12B through P2P tunnel 14A, and to egress PE router 12D through P2P tunnel 14C. When ingress PE router 12A then sends the VPN 1 traffic and VPN 2 traffic, the packets are sent through the appropriate P2P tunnels 14 bearing an outer label that identifies the transport tunnel 14C, and an inner VPN label that was advertised by the respective PE routers 12. VPN 1 and VPN 2 traffic are depicted with dashed lines in FIG. 1, as indicated in legend 28.

Links and nodes in a computer network can sometimes fail. Consequently, one of the tunnels that the ingress network device was using to communicate with an egress network device may stop functioning. To ensure that the ingress network device and the egress network device do not send messages on a tunnel that is not functioning, the devices may periodically verify the status of the tunnel's path by sending a message through the path and receiving a response through the path, such as by using LSP Ping. It would be helpful for egress network devices 12B-12D to become quickly aware when a service that was received through the P2P tunnel 14 has become unavailable, such as due to the P2P tunnel 14 going down. However, there are several issues that can make this difficult in certain situations, such as in the ingress replication context.

For example, by the nature of ingress replication, the egress PE router 12 or the last hop router allocates labels for different services that the egress PE router intends to receive from the upstream routers (ingress PE router 12A). The ingress PE router 12A uses the downstream allocated labels to push different services to the egress PE router 12 over the P2P tunnels 14. In some networks, the outer MPLS label(s) are removed ("popped") from packets on the tunnels at the penultimate router (or "hop") of the tunnel, a mechanism referred to as "penultimate hop popping" (PHP). In the absence of the techniques of this disclosure, simply running an OAM protocol (such as BFD) over the P2P tunnel does not help the egress PE router determine when a service that was received through the P2P tunnel 14 has become unavailable. This is because if penultimate hop popping (PHP) is in use, then all the control packets/data arrive bearing only the service label, and so the egress PE router 12 cannot determine which P2P tunnel delivered the service to it.

In addition, even if PHP is not in use, in some cases the routing hardware of the egress PE router 12 is such that the top most label (transport label) associated with the P2P tunnel 14 is stripped off in the data plane of the egress PE router 12, and thus is not available to the control plane of the egress PE router 12. In this situation, it likewise becomes very difficult for the egress PE router 12 to determine the incoming P2P tunnel 14 of the service. As a result of these issues, and in the absence of the techniques of this disclosure, it can be very difficult for the egress PE router to make the association of the incoming multicast services and the incoming tunnel on the egress router. Without this association, running OAM protocols (such as BFD) on the P2P tunnel will not help, because the egress router will not have information that indicates what services are affected by this particular P2P tunnel going down.

In accordance with the techniques of this disclosure the egress PE router 12 can obtain the association between the multicast service and the P2P tunnel in order to leverage the OAM session running over the P2P tunnel and fate share the OAM with the incoming multicast services. Two example solutions set forth in this disclosure include (1) using existing TLVs of P2P LSP ping to exchange the service labels to the egress, and (2) extending P2P LSP ping with a new TLV to carry information related to the services carried over the LSP to the egress.

In one example, PE router 12A uses the LSP ping protocol for probing and testing the P2P tunnels 14 and for verifying the data plane of P2P tunnels 14 against the control plane of the routers along the path. PE router 12A operates as an ingress router (head end) of P2P tunnel 14C and uses the LSP ping protocol to periodically send out LSP ping packets (e.g., echo request packets) that are embedded with information that PE router 12D as the egress router (tail end) of the P2P tunnel 14C can use to determine one or more services that are provided by the ingress router 12A over the P2P tunnel 14C. For example, the LSP ping packets may specify one or more service labels that were originally allocated and advertised by the egress router 12D, where the service labels are for services requested by the egress router 12D and provided by the ingress router over the P2P tunnel 14C.

In one example, as the ingress router, router 12A can make the association of the P2P tunnel with the multicast services sent over the P2P tunnel by sending one LSP ping message 22 per multicast service (VPNs for example) over the P2P tunnel 14C, resulting in multiple LSP ping messages being sent when there are multiple services. The FEC stack of each LSP ping message 22 may consist of the transport LSP FEC and the Service/VPN label.

When router 12D as the egress router receives these LSP ping messages 22, router 12D can associate the various services with their respective P2P tunnel, and store these associations to service/tunnel mappings. One advantage of this approach is that it can be accomplished without having to define any new TLVs by reusing any existing TLVs already defined in the LSP ping protocol. For example, the NIL FEC could be used if the egress router can unambiguously identify the service (that does not fall into any of the already defined sub-TLV types) from the label itself. One potential disadvantage, however, is that a ping is sent for every service that the ingress provides a particular egress, resulting in a potentially large number of LSP ping messages, so for this approach both the egress and ingress should be able to handle a large number of LSP ping messages. However, the sending of the LSP ping message with the service information can in some examples be an application-driven event (e.g., upon receipt by the ingress router of a request for services from an egress router, or whenever there is a change in VPNs). Once the egress router 12D makes the association, in some examples it may not be required for router 12A to generate periodic ping packets for this purpose. Although, every time a new service is added, router 12A may initiate a new echo request to complete the binding. Router 12A may likewise initiate a new echo request when ingress router 12A decides to stop services on a particular P2P LSP. In other examples, router 12A may send LSP ping messages periodically, as in conventional LSP ping.

Another example approach is to extend the P2P LSP ping protocol to include a new TLV specifically designed to carry enough information to the egress router 12D so that the egress router can associate with the P2P LSP multiple services that are riding on top of P2P LSP. Router 12A can thus send a single LSP ping message 22 per transport P2P LSP to each of its various egress routers 12B-12C, with each LSP ping message containing information pertaining to all the services that the ingress is choosing to provide over the P2P LSP to the respective egress router.

For example, in FIG. 1 PE router 12A provides two services to PE router 12D, i.e., VPN 1 traffic and VPN 2 traffic. In one example aspect, router 12A can send a single LSP ping message 22 for P2P tunnel 14C that specifies two service labels, a first label associated with VPN 1 and a second label associated with VPN 2. These are the same labels that router 12A received from router 12D. The LSP ping message 22 also indicates a FEC of the P2P tunnel 14C, which identifies the P2P tunnel 14C. In another example aspect, router 12A can send two separate LSP ping messages 22, a first LSP ping message that specifies the first label associated with VPN 1, and a second LSP ping message that specifies the second label associated with VPN 2.

In the example of FIG. 1, a fault detection network protocol is enabled between router 12A and router 12D to monitor a state of the P2P tunnel 14C. For purposes of example, the fault detection network protocol may be BFD, such as described in R. Aggarwal, "Bidirectional Forwarding Detection (BFD) for MPLS Label Switched Paths (LSPs)," RFC 5884, June 2010, the entire contents of which are incorporated by reference herein. Additional BFD sessions (not shown) may be enabled between router 12A and routers 12B, 12C. To use BFD for fault detection on an MPLS LSP such as P2P tunnel 14C, edge router 12A and service node 20A establish a BFD session 26 for that particular MPLS LSP. The BFD session 26 may be established using LSP Ping messages, for example. BFD control packets are sent along the same data path as the P2P tunnel 14C being verified. BFD for MPLS LSPs typically used to detect a data plane failure in the MPLS LSP path, even when the control plane of devices associated with the MPLS LSP is functional.

In the example of FIG. 1, BFD session 26 used to communicate, between router 12A to router 12D, that a performance degradation or failure has occurred with P2P tunnel 14C. In response to detecting based on the BFD session that the state of the P2P tunnel is down, egress PE router 12D can determine based on the stored association between the service label and the P2P tunnel 14C, that the service is unavailable from the ingress network device 12A via the P2P tunnel 14C, and egress PE router 12D can select a new source to provide the service. For example, egress PE router 12D may select PE router 12E as a new source from which to receive the service originating from source 24. PE router 12E may establish a P2P tunnel (not shown) to PE router 12D through which to provide the service.

Apart from the example of associating MVPN services, other services (such as pseudowires, for example) can be associated to a P2P tunnel 14 (e.g., LSP) using the techniques of this disclosure in which the ingress router 12A of the LSP signals the association to the egress router 12 of the LSP. Thus, in another example aspect, the techniques of this disclosure can be used for associating multiple pseudowires to a transport P2P LSP 14.

In the absence of the techniques of this disclosure, the egress router of a pseudo-wire does not have information about what P2P tunnel was used to carry the pseudo-wire. It might prove useful to hold this state information in case the egress router is ready to take some action when the P2P tunnel goes down. Currently this has more of a use case in multicast scenarios mainly because the action to be taken upon fault detection lies mainly at the egress router, unlike traditional P2P scenarios.

Figure 2:
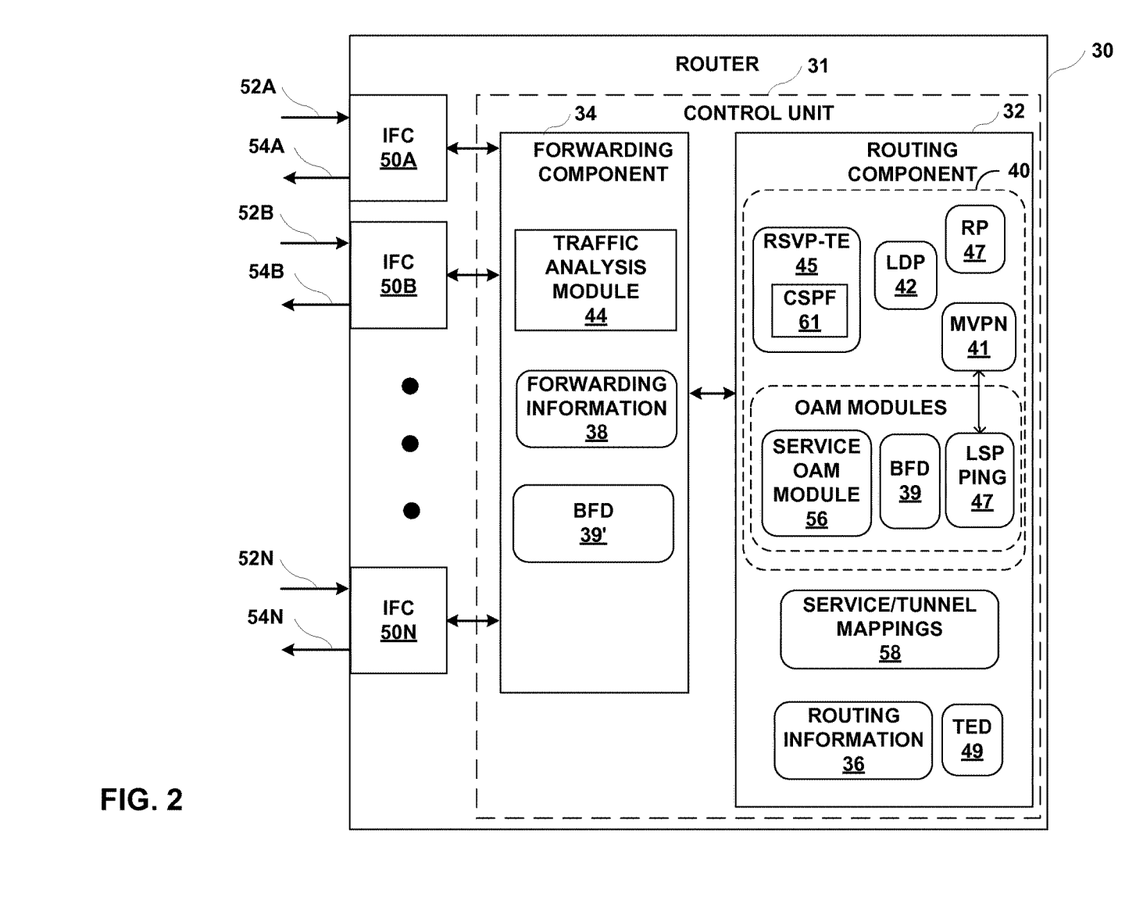
FIG. 2 is a block diagram illustrating an exemplary network device in accordance with the disclosure herein.

FIG. 2 is a block diagram illustrating an example an exemplary router 30 in accordance with this disclosure. Router 30 may, for example, represent any of routers 12 of FIG. 1. In this example, router 30 includes a control unit 31 that comprises a routing component 32 and a forwarding component 34. In addition, router 30 includes a set of interface cards (IFCs) 50A-50N (collectively, "IFCs 50") for communicating packets via inbound links 52A-52N (collectively, "inbound links 52") and outbound links 54A-54N (collectively, "outbound links 54").

Routing component 32 primarily provides an operating environment for control plane protocols 50. For example, one or more routing protocols ("RP") 47 maintain routing information 36 to reflect the current topology of a network and other network entities to which it is connected. In particular, routing protocols 47 updates routing information 36 to accurately reflect the topology of the network and other entities. Example routing protocols include Border Gateway Protocol (BGP), the Intermediate System to Intermediate System (ISIS) routing protocol, the Open Shortest Path First (OSPF) routing protocol, among others.

Routing component 32 generates and programs forwarding component 34 with forwarding information 38 that associates network destinations with specific next hops and corresponding interfaces ports of IFCs 50 in accordance with routing information 36. Routing component 32 may generate forwarding information 38 in the form of a radix tree having leaf nodes that represent destinations within the network, for example.

Based on forwarding information 38, forwarding component 34 forwards packets received from inbound links 52A-52N to outbound links 54A-54N that correspond to next hops associated with destinations of the packets. U.S. Pat. No. 7,184,437 provides details on an exemplary embodiment of a router that utilizes a radix tree for route resolution. The entire contents of U.S. Pat. No. 7,184,437 are incorporated herein by reference.

In one example, forwarding component 34 is a rich and dynamic shared forwarding plane, optionally distributed over a multi-chassis router. Moreover, forwarding component 34 may be provided by dedicated forwarding integrated circuits normally associated with high-end routing components of a network router. Further details of one example embodiment of router 30 can be found in U.S. patent application Ser. No. 12/182,619, filed Jul. 30, 2008, entitled "STREAMLINED PACKET FORWARDING USING DYNAMIC FILTERS FOR ROUTING AND SECURITY IN A SHARED FORWARDING PLANE," the entire contents of which are incorporated herein by reference.

As shown in FIG. 2, protocols 40 executing within routing component 32 includes one or more MPLS protocols for establishing a P2P LSP. For example, RSVP-TE 45 may generate and maintain a traffic engineering database 49, including bandwidth reservations for paths associates with MPLS LSPs. Constrained Shortest Path First (CSPF) process 61 computes a shortest path or paths for an MPLS LSP based on specified constraints and bandwidth availability information associated with the links within the network. RP 47 may, in turn, advertise the calculated bandwidth availability information in traffic engineering database (TED) 49 to other peer routers. As another example, Label Distribution Protocol (LDP) 42 may send and receive label mapping messages for establishing a P2P LSP.

Moreover, as shown in FIG. 2, protocols 40 may include Operations, Administration, and Management protocols, such as LSP ping protocol 47 and BFD protocol 39, that operate as described herein. For example, LSP ping protocol 47 executes to probe and test an LSP and verify the data plane of routers along the LSP against their respective control planes. In addition, LSP ping protocol 47 has been extended so as to send or receive/process LSP ping packets that include information specifying one or more services provided over a P2P tunnel, such as P2P tunnels 14 of FIG. 1. In the example of FIG. 2, OAM modules include service OAM module 56, which can store service/tunnel mapping data from the LSP ping packets, and can later refer to the mapping information when BFD module 39 detects that a P2P tunnel has failed. Although represented for purposes of example as a separate module, in some aspects, functionality of service OAM module 56 may be part of LSP ping module 47 and/or BFD module 39.

In one example, router 30 operates as an ingress router (head end) of a P2P tunnel such that LSP ping protocol 47 periodically sends out LSP ping packets (e.g., echo request packets) that are embedded with information that an egress router (tail end) of the P2P tunnel can use to determine one or more services that are provided by the ingress router over the P2P tunnel In one example, as the ingress router, router 30 can make the association of the P2P tunnel with the multicast services sent over the P2P tunnel by sending one LSP ping message per multicast service (VPNs for example) over the P2P tunnel, resulting in multiple LSP ping messages being sent when there are multiple services. The FEC stack of each LSP ping message may consist of the transport LSP FEC and the Service/VPN label. When router 30 as the egress router receives these LSP ping messages, service OAM module 56 can associate the various services with their respective P2P tunnel, and store these associations to service/tunnel mappings 58.

Another example approach is to extend the P2P LSP ping protocol to include a new TLV specifically designed to carry enough information to the egress router so that the egress router can associate with the P2P LSP multiple services that are riding on top of P2P LSP. For example, if MVPN 41 is making use of ingress replication as provider tunnel to provide various VPN services over P2P tunnels, then router 30 as the ingress router can choose to send a single LSP ping packet to each egress router, containing the VPN labels of all the VPNS that are riding over the P2P tunnel. The VPN labels are downstream allocated by the egress router, so the egress router understands those labels and by looking at the transport FEC of the incoming LSP ping the egress router can associate the various VPNs to this particular LSP. By doing this the egress router can now determine which VPN services are affected when a particular P2p LSP goes down. This solution is a better fit when the egress router cannot unambiguously identify the service from the label (existing sub TLVs itself).

In order to achieve this, a new sub TLV is defined under the LSP ping protocol, and LSP ping module 47 of router 30 as the egress router is configured to interpret this new TLV as an indication to make the association of various services running on top of the P2P LSP. Moreover, this new TLV can further be leveraged for other services, and not just for ingress replication.

Further, protocols 40 may execute one or more service-level applications, such as multicast virtual private network (MVPN) service 41. For example, when router 30 operates as an ingress router P2P LSP, MVPN service 41 may receive communications from other MVPN service 41 executing on other routers indicating that the other routers request to receive a service via the P2P LSP, such as an MVPN service in which VPN traffic is distributed via the P2P LSP. In response to the communication, MVPN service 41 may direct LSP ping protocol 47 to output an LSP ping request the egress router, where the LSP ping request has been constructed by LSP ping protocol 47 to embed the service label in the LSP ping request. When operating as an egress node for a P2P LSP, LSP ping protocol 47 receives incoming LSP ping requests originally sent from an ingress router of the P2P LSP. LSP ping protocol 47 processes the LSP ping requests to extract the embedded service labels and the FEC used to identify the P2P LSP. Service OAM module 56 stores the service label and FEC to service/tunnel mappings 58.

In another example, router 30 operates as an egress router (tail end) of a P2P tunnel, such that the LSP ping protocol 47 of router 30 receives an LSP ping echo request packet and service OAM module 56 stores data from the echo request packet, including the service label information and information that identifies the P2P tunnel on which the echo request packet is received, to service/tunnel mappings 58.

In addition, BFD module 39 runs a BFD session between router 30 and the ingress router of the P2P tunnel to detect a data plane failure in the forwarding path of a P2P LSP. Router 30 operating as an egress router may utilize BFD protocol 39 to quickly detect a data plane failure in the forwarding path of a P2P LSP. BFD protocol 39 of routing component 32 may program BFD logic 39' in forwarding component 34 or similar logic (not shown) in any of IFCs 50 to monitor incoming BFD packets and report a data plane failure for the P2P LSP, thereby allowing routing component 32 to respond to failure events associated with the P2P LSP by identifying services affected by the failures and securing an alternate source for the affected services. For example, in response to BFD module 39 detecting based on the BFD session that the P2P tunnel has failed or degraded, service OAM module 56 can check service/tunnel mappings 58 to determine which services are provided over the P2P tunnel and are therefore affected by the failure. Service OAM module 56 can provide this information to multicast virtual private network (MVPN) module 41 of routing component 32 so that MVPN module 41 can select an alternate source for the affected services. In response, MVPN module 41 can advertise one or more new service labels to alternate ingress router(s) that can provide the service(s).

In this manner, the router 30 does not need to establish a BFD session for each service, but only needs one BFD session for the P2P tunnel. This can greatly reduce the number of OAM sessions that router 30 must establish. Additionally, by fate sharing the OAM of the services with that of the P2P tunnel, router 30 can act on failures in a much more efficient and quicker manner than acting on individual service failures. Router 30 can take bulk action to secure new sources for multiple lost services based on a single failure notification, instead of handling multiple failure notifications.

In one embodiment, each of forwarding component 34 and routing component 32 may comprise one or more dedicated processors, hardware, and/or computer-readable media storing instructions to perform the techniques described herein. Forwarding component 34 and routing component 32 may be communicatively coupled by a data communication channel. The data communication channel may be a high-speed network connection, bus, shared-memory or other data communication mechanism.

The architecture of router 30 illustrated in FIG. 2 is shown for exemplary purposes only. In other embodiments, router 30 may be configured in a variety of ways. In one embodiment, for example, control unit 31 and its corresponding functionality may be distributed within IFCs 50.

Control unit 31 may be implemented solely in software, or hardware, or may be implemented as a combination of software, hardware, or firmware. For example, control unit 31 may include one or more processors which execute software instructions. In that case, the various software modules of control unit 31, such as protocols 40, may comprise executable instructions stored on a computer-readable medium, such as computer memory or hard disk.

Figure 3:
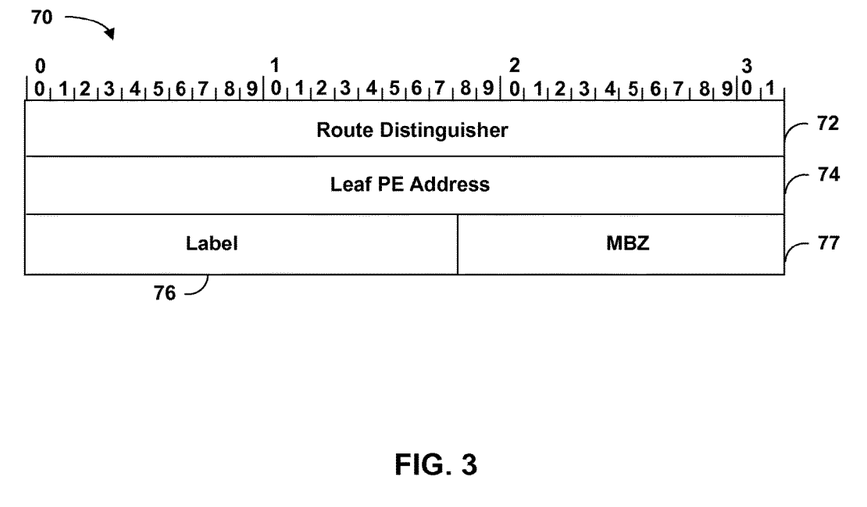
FIG. 3 is an example illustration of an example LSP ping packet format that may be used in accordance with the techniques described herein.

FIG. 3 is an example illustration of an example type-length-value (TLV) format 70 for an LSP ping packet that may be used in accordance with the techniques described herein. The new TLV is referred to herein as a "Service Association TLV."

The Network Working Group's RFC 4379 defines the format for carrying TLVs in LSP Echo Request message. The new TLV and sub-TLV defined here are based on the packet format with TLVs specified in Section 3 of RFC 4379. See K. Kompella, "Detecting Multi-Protocol Label Switched (MPLS) Data Plane Failures, RFC 4379, February 2006, the entire contents of which are incorporated by reference herein. The type number is to be defined, and the Value Field is Service Association.

In accordance with the techniques of this disclosure, the newly proposed Service Association (SA) TLV can contain the list of services that are associated or carried over the P2P LSP on which the LSP Echo Request is sent containing the SA TLV. For example, the SA TLV can contain the services as sub-TLVs. Each service can be represented as a "FEC" in a FEC stack. In, this aspect the SA TLV is similar to the semantics of Target FEC Stack TLV specified in Section 3.2 of RFC 4379.

TABLE 1 lists example sub-TLVs that can be defined to be included in the SA TLV.

TABLE 1

| Sub-Type | Length | Value Field |
| --- | --- | --- |
| 1-9 | | Not Assigned |
| 10 | 14 | "FEC 128" Pseudowire |
| 11 | 16+ | "FEC 129" Pseudowire |
| 12-15 | | Not Assigned |
| 16 | 4 | Nil FEC |
| 17 | 16 | MVPN Ingress Replication Leaf |

The formats of FEC 128 pseudowire, FEC 129 pseudowire and Nil FEC are specified in Sections 3.2.9, 3.2.10 and 3.2.15 of RFC 4379, respectively.

Figure 4:
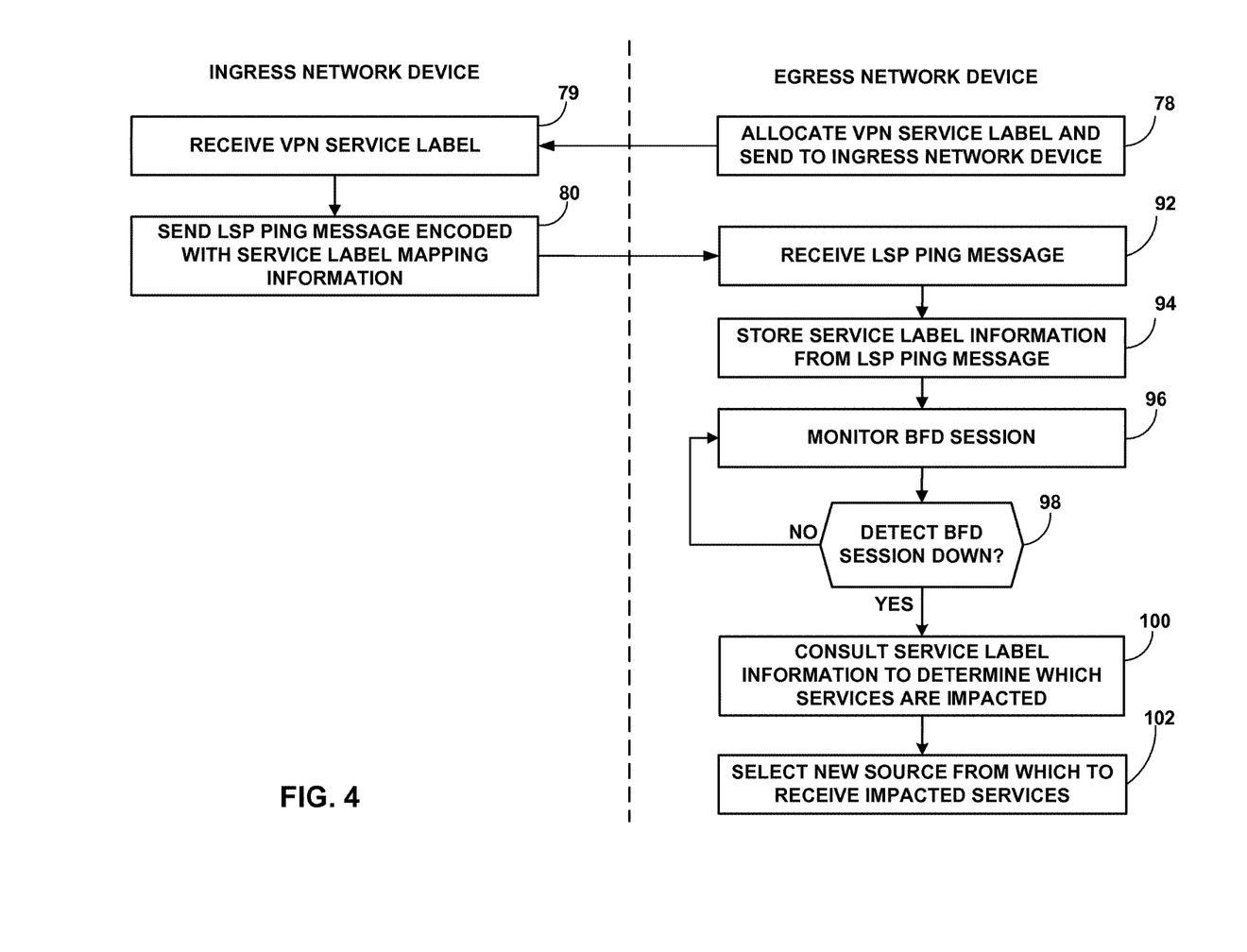
FIG. 4 is a flowchart illustrating an example mode of operation of network devices in a network in using the techniques described herein.

MVPN Ingress Replication Leaf is a new FEC that is being introduced as part of this proposal. The format of the MVPN Ingress Replication Leaf sub-TLV data is provided in FIG. 4. Similar sub-TLV data can be used for other contexts other than MVPN Ingress Replication. In the example of FIG. 4, the Route Distinguisher field 82 includes the Route Distinguisher that was advertised by the leaf or remote PE in its Intra-AS I-PMSI A-D Route. See section 4.1 of RFC 6514, R. Aggarwal "BGP Encodings and Procedures for Multicast in MPLS/BGP IP VPNs," Internet Engineering Task Force, RFC 6514, February 2012. The entire contents of RFC 6514 are incorporated by reference herein. For example, referring to FIG. 1, PE router 12A can generate an LSP Ping echo request packet having the SA TLV 70, in which the Route Distinguisher field 72 includes the Route Distinguisher that was advertised by PE router 12D in its Intra-AS I-PMSI A-D Route.

The Leaf PE Address field 74 includes the IP address of leaf or remote PE which is the same as the Tunnel Identifier in PMSI tunnel attribute of Intra-AS I-PMSI A-D Route (section 5 of RFC 6514). The Label field 76 includes the label advertised by the leaf PE in the PMSI tunnel attribute of its Intra-AS I-PMSI A-D Route (section 5 of RFC 6514). The Must Be Zero (MBZ) field 77 has a zero value.

The Ingress or LSP head router may advertise the services it associates with the P2P LSP to the leaf or Egress PE using the following two options. Option 1: Ingress router may include in an LSP Echo Request message an SA TLV that contains the list of "MVPN Ingress Replication Leaf" sub-TLVs. The "Leaf PE address" and "Label" of the sub-TLV are set to the same values advertised by Egress router or LSP tail end in "Tunnel Identifier" and "MPLS label" in MVPN PMSI attribute of Intra-AS I-PMSI A-D Route (section 5 of RFC 6514).

Option 2: Ingress router may include in an LSP Echo Request an SA TLV that contains the list of "Nil FEC" sub-TLVs. The Label is obtained from "MPLS label" in MVPN PMSI attribute of Intra-AS I-PMSI A-D Route. This option can be used if the Ingress router has information beforehand that the Leaf or Egress router is capable to map to the correct MVPN VRF instance just from the MPLS label in PMSI tunnel attribute of Intra-AS I-PMSI A-D Route. For example, routers 12 in FIG. 1 may advertise capabilities in this respect.

Apart from the example of associating MVPN services, other services (such as pseudowires, for example) can be associated to a P2P LSP using the techniques of this disclosure in which the ingress router of the LSP signals to the egress router of the LSP. Thus, in another example aspect, the techniques of this disclosure can be used for associating multiple Pseudowires to a transport P2P LSP. For example, if the ingress router of the LSP intends to carry multiple pseudowires (e.g., FEC 128 pseudowires) over a transport P2P LSP, then the ingress router can notify the egress router of the pseudowire services running over the transport P2P LSP using multiple sub-TLVs of type 10 "FEC 128" Pseudowire in the SA TLV.

FIG. 4 is a flowchart illustrating an example mode of operation of network devices in a network in using the techniques described herein. FIG. 4 will be described for purposes of example with respect to FIGS. 1-3. The egress network device (such as any of egress router 12B, 12C, or 12D) allocates a VPN service label and sends the VPN service label to the ingress network device from which the egress network device requests to receive the VPN service (78). In response to receiving the VPN service label (79), the ingress network device sends the LSP ping message encoded with service label information (80). For example, ingress router 12A sends the LSP ping echo request packet 22 that includes the MVPN sub-TLV 70 of FIG. 3, specifying the VPN service label that was advertised by egress network device 12D.

The egress network device receives the LSP ping echo request packet 22 (92), and service OAM module 56 stores the service label and the Leaf PE address (or other data that identifies the P2P LSP) from the LSP ping message to service/tunnel mappings 58 (94). In some examples, the LSP ping message may encode multiple service labels of multiple services associated with the P2P LSP. In addition, the egress network device uses BFD module 39 to monitor the BFD session running on the P2P tunnel (96).

If the egress network device detects that the BFD session goes down or loses sufficient quality (YES branch of 98), indicating that the P2P tunnel is down or has degraded, the egress network device consults the stored service label information, e.g., service/tunnel mappings 58, to determine which services are associated with the P2P tunnel (100). For example, BFD module 39' may detect the loss of connectivity, and may inform BFD module 39 in the control plane. BFD 39 may invoke service OAM module 56 (service OAM module 56 can, in some examples, be part of BFD 39), to look up in service/tunnel mappings 58 the P2P tunnel FEC of the P2P tunnel on which the BFD session runs. In looking up the P2P tunnel FEC, service OAM module 56 can identify one or more service labels that are associated with the P2P tunnel, these having been previously stored upon receipt of LSP ping messages specifying the associations. In this way, the egress network device determines which services are impacted by the loss of connectivity through the P2P tunnel. The egress network device can then select a new source for the lost service(s) (102). For example, router 12D can select router 12E as a new source, and can send a message to router 12E advertising a service label and requesting a second instance of the service from router 12E.

By fate sharing the OAM of the services with that of the P2P tunnel in this manner, the egress network device can act on failures in a more efficient and quicker manner than acting on individual service failures. The egress network device can take bulk action to secure new sources for multiple lost services based on a single failure notification, instead of handling multiple failure notifications.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various aspects of this disclosure have been described. These and other aspects are within the scope of the following claims.

The invention claimed is:

1. A method comprising:
by an ingress network device of a point-to-point (P2P) tunnel, receiving a first request from an egress network device of the P2P tunnel for a first service to be provided by the ingress network device to the egress network device via the P2P tunnel;
by the ingress network device, receiving a second request from the egress network device for a second service to be provided by the ingress network device to the egress network device via the P2P tunnel, wherein the P2P tunnel serves as a transport tunnel for the first service and the second service; and
in response to receiving the first request and the second request, and by the ingress network device, sending to the egress network device a single connectivity detection protocol message that advertises the first service and the second service as services the ingress network device associates with the P2P tunnel.

2. The method of claim 1,
wherein receiving the first request and the second request comprises receiving a first service request and a second service request that specify respective first and second service labels, allocated by the egress network device, for the ingress network device to use when advertising the first service and the second service, and
wherein sending the single connectivity detection protocol message comprises sending the single connectivity detection protocol message that includes the first and second service labels to advertise the first service and the second service, respectively.

3. The method of claim 2, wherein the first and second labels comprise respective virtual private network (VPN) labels allocated by the egress network device.

4. The method of claim 1,
wherein the single connectivity detection protocol message comprises a Label Switched Path (LSP) Ping message, and wherein the LSP ping message specifies the first service and the second service in a type length value (TLV) field of the LSP ping message.

5. The method of claim 1, further comprising:
after sending to the egress network device the single connectivity detection protocol message, adding, by the ingress network device, an additional service to be provided by the ingress network device to the egress network device via the P2P tunnel; and
sending, by the ingress network device, an echo request message that specifies the additional service.

6. The method of claim 1, wherein the single connectivity detection protocol message comprises a first connectivity detection protocol message, wherein the egress network device comprises a first egress network device, and wherein the P2P tunnel comprises a first P2P tunnel, and wherein the ingress network device is an ingress network device of a second P2P tunnel having a second egress network device, the method further comprising:
by the ingress network device, receiving a third request from the second egress network device of the second P2P tunnel for a third service to be provided by the ingress network device to the second egress network device via the second P2P tunnel, wherein the second P2P tunnel serves as a transport tunnel for the second plurality of services; and in response to receiving the third request, and by the ingress network device, sending to the second egress network device a single second connectivity detection protocol message that advertises the third service, wherein at least one of the first service and the second service are different than at the third service.

7. The method of claim 1, wherein the P2P tunnel comprises a P2P label switched path (LSP) established between the ingress network device and the egress network device.

8. A network device comprising:
an interface for receiving a first request from an egress network device of a point-to-point (P2P) tunnel for a first service to be provided by the network device to the egress network device via the P2P tunnel, and for receiving a second request from the egress network device for a second service to be provided by the network device to the egress network device via the P2P tunnel, wherein the P2P tunnel serves as a transport tunnel for the plurality of services; and
a hardware-based processor for executing a connectivity detection protocol component configured to, in response to receiving the first request and the second request, send to the egress network device a single connectivity detection protocol message that advertises the first service and the second service as services the network device is associates with the P2P tunnel.

9. The network device of claim 8,
wherein the first request and the second request comprises a first service request and a second service request that specify respective first and second service labels, allocated by the egress network device, for the network device to use when advertising the first service and the second service, and
wherein the single connectivity detection protocol message comprises a single connectivity detection protocol message that includes the first and second service labels to advertise the first service and the second service, respectively.

10. The network device of claim 9, wherein each of the first and second labels comprises respective virtual private network (VPN) labels allocated by the egress network device.

11. The network device of claim 8,
wherein the single connectivity detection protocol message comprises a Label Switched Path (LSP) Ping message, and wherein the LSP ping message specifies the first service and the second service in a type length value (TLV) field of the LSP ping message.

12. The network device of claim 8, wherein the connectivity detection protocol component executing on the hardware-based processor is configured to send an echo request message that specifies an additional service to be provided by the network device to the egress network device via the P2P tunnel, which was added by the network device after sending to the egress network device the single connectivity detection protocol message.

13. The network device of claim 8, wherein the P2P tunnel comprises a P2P label switched path (LSP) established between the network device and the egress network device.

14. A non-transitory computer-readable storage medium comprising instructions for causing a programmable processor of an ingress network device of a point-to-point (P2P) tunnel to:
receive a first request from an egress network device of the P2P tunnel for a first service to be provided by the ingress network device to the egress network device via the P2P tunnel;

by the ingress network device, receiving a second request from the egress network device for a second service to be provided by the ingress network device to the egress network device via the P2P tunnel, wherein the P2P tunnel serves as a transport tunnel for the plurality of services; and in response to receiving the first request and the second request, send to the egress network device a single connectivity detection protocol message that advertises the first service and the second service as services the ingress network device associates with the P2P tunnel.

* * * * *